United States Patent
Ryu et al.

(10) Patent No.: US 7,106,838 B2
(45) Date of Patent: Sep. 12, 2006

(54) METHOD FOR SERVING CHARACTER MESSAGE TRANSMISSION DURING TELEPHONE CALL OVER PSTN

(75) Inventors: Young-Gyu Ryu, Suwon-shi (KR); Jin-Won Kim, Paju-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 10/347,235

(22) Filed: Jan. 21, 2003

(65) Prior Publication Data

US 2003/0147514 A1 Aug. 7, 2003

(30) Foreign Application Priority Data

Feb. 1, 2002 (KR) .................................. 2002-5978

(51) Int. Cl.
*H04M 11/00* (2006.01)
(52) U.S. Cl. ............................... 379/93.01; 379/93.17; 455/466
(58) Field of Classification Search ............. 379/93.01, 379/93.08, 93.17, 142.01; 455/466
See application file for complete search history.

(56) References Cited

U.S. PATENT DOCUMENTS

| | | | | |
|---|---|---|---|---|
| 5,812,649 | A * | 9/1998 | Shen ...................... | 379/142.14 |
| 6,339,639 | B1 * | 1/2002 | Henderson ............. | 379/142.08 |
| 6,484,027 | B1 * | 11/2002 | Mauney et al. ............. | 455/421 |
| 6,529,737 | B1 * | 3/2003 | Skinner et al. ............. | 455/466 |
| 6,748,229 | B1 * | 6/2004 | Calatrava-Requena et al. .. | 455/466 |
| 2002/0183081 | A1 * | 12/2002 | Elizondo Alvarez ........ | 455/466 |
| 2003/0228010 | A1 * | 12/2003 | Clarisse et al. ........ | 379/142.01 |

* cited by examiner

*Primary Examiner*—Stella Woo
(74) *Attorney, Agent, or Firm*—Robert E. Bushnell, Esq.

(57) ABSTRACT

The present invention discloses a method for serving character message transmission during a telephone call over PSTN connected to the central office to which information terminals having displays are connected for telephone calls and for data communication, the method including the steps of: based on SMS message writing and transmission request for use of character message transmission service of the first information telephone subscriber during a telephone call between a first and a second information telephone subscribers among the information telephones, if the customer premise equipment (CPE) alerting signal (CAS) is transmitted from the first information telephone in order to secure data transmitting/receiving reliability, muting, at the first information telephone, a handset of the first information telephone, transferring the CAS to the second information telephone through the central office in order to data transmitting/receiving reliability, and receiving a first acknowledge (ACK) message in response; after receiving the first ACK message, transferring, at the first information telephone, a message to the second information telephone through the central office for notifying the second information telephone to get prepared for receiving the written SMS message, and receiving a second ACK message in response; after receiving the second ACK message, transferring, at the first information telephone, the written SMS message to the second information telephone through the central office, and receiving a third ACK message in response; and after receiving the third ACK message, releasing, at the first information telephone, the handset of the first information telephone, and maintaining a busy state between the first and the second information telephone subscribers.

7 Claims, 4 Drawing Sheets

METHOD FOR SERVING CHARACTER MESSAGE TRANSMISSION DURING TELEPHONE CALL OVER PSTN

CLAIM OF PRIORITY

This application makes reference to, incorporates the same herein, and claims all benefits accruing under 35 U.S.C. §119 from an application for METHOD FOR MESSAGE TRANSFER SERVICE DURING TELEPHONE CALL SERVICE IN PSTN earlier filed in the Korean Industrial Property Office on 1 Feb. 2002 and there duly assigned Serial No. 2002-5978.

BACKGROUND OF THE INVENTION

1. Field of the Invention

The present invention relates generally to telecommunication systems, and more specifically, to a method for serving character message transmission during telephone calls using voice channel over PSTN (Public Switched Telephone Network).

2. Description of the Related Art

E-mail (electronic mail) service or SMS (Short Message Service) is available to the vast majority of terminals like computers or cellular phones. To keep abreast of such a communication environment, more people now want to get the e-mail service and SMS using their wire telephones at homes and in offices. Therefore, transmitting/receiving data over the general wire telephone networks using voice channels is no longer a dream. In fact, a number of people are already enjoying the caller ID (hereinafter, referred to as "CID", caller identity or caller identification) display service, and short message service (hereinafter, referred to as "SMS") by transmitting/receiving data through voice channels over the general wired telephone networks. Through CID display service, a terminating party (receiving party) is provided with information about a caller (name, calling time, caller's phone number) before picking up the phone, or about another caller who made a call while the terminating party being in the middle of conversation on the phone with a different person. On the other hand, SMS service enables any PSTN (Public Switched Telephone Network) subscriber or mobile communication subscriber to transceive an SMS message, e-mail with other Internet users, and facsimile messages. Data transmission through voice channel in such services is done by using FSK (frequency shift keying) method.

More specifically, CID display service is provided in conforming to the following procedure. In case that the CID display service is provided before a caller and a called party, talk on the phone, the central office provides CID of the caller to the called party between the first ring signal and the second ring signal. Meanwhile, if the CID display service is provided in the middle of the conversation between the caller and the called party, that is, a third party calls, the central office first transports CAS (CPE (Customer premise equipment) Alerting Signal) to the called party, and receives ACK (Acknowledgement) from the called party, and transports the CID for the third party to the called party.

Next, SMS is provided in conforming to the following procedure. To transmit SMS message from a terminal, a subscriber needs to dial a PSMSC (PSTN Short Message Service Center) number, a server for providing SMS message service, and connects to the PSMSC. In this way, the voice channel between the terminal and the PSMSC is successfully connected. Then, PSMSC transmits CAS to the terminal, and the terminal, having received the CAS, responds as ACK. In this manner, data transmission is initialized. Afterward, the terminal transports SMS message to PSMSC. Transmission of the SMS message from a terminal is almost the same with the above procedure except that the PSMSC's phone number is included in the CID of the call. The PSMSC's phone number is necessary for automatic termination. After the voice channel is connected with PSMSC, data transmission is initialized, and the PSMSC receives the SMS message that the terminal transmitted. Here, the data transmission protocol and electrical characteristic associated with the CID display service and SMS conform to short message send-receive interface technical regulation over the wire network and to data transmission interface technical regulation in PSTN (Public Switched Telephone Network) subscriber line for the CID display, which are established by Korea Telecom Inc.

Nevertheless, CID display services and SMS in which data can be transceived using voice channels over the general wire telephone network are possible only through a server like the PSMSC. Therefore, the services are not available when a caller and a called party want to communicate using characters in the middle of their conversation over the general wire telephone network.

SUMMARY OF THE INVENTION

It is, therefore, an object of the present invention to provide a method for serving character message transmission during a telephone call service over PSTN (Public Switched Telephone Network) without using any server.

Another object of the present invention is to provide a method for performing voice call service using a voice channel over PSTN and character message transfer service at the same time without using any server.

Still another object of the present invention is to provide a method for exchanging character messages during a telephone call between subscribers who use wire telephones, especially in case of having a difficult time to confirm voice information owing to inaccurate pronunciation of one party or in the case of telling a series of numbers (e.g., telephone numbers or bank account numbers).

To achieve the above and other objects, there is provided a method for serving character message transmission during a telephone call over PSTN connected to a central office to which a number of information telephones mounted with a display, respectively, are connected for telephone calls as well as for data communication, the method including the steps of: based on SMS message writing and transmission request for use of character message transmission service of a first information telephone subscriber during a telephone call between a first information telephone subscriber and a second information telephone subscriber among the information telephones, if the customer premise equipment (CPE) alerting signal is transmitted from the first information telephone in order to secure data transmitting/receiving reliability, muting, at the first information telephone, a handset of the first information telephone, transferring customer premise equipment (CPE) alerting signal to the second information telephone through the central office in order to data transmitting/receiving reliability, and receiving a first acknowledge message in response; after receiving the first acknowledge message, transferring, at the first information telephone, a message to the second information telephone through the central office for notifying the second information telephone to get prepared for receiving the written SMS message, and receiving a second acknowledge message in response; after receiving the second acknowledge message, transferring, at the first information telephone, the written SMS message to the second information telephone through the central office, and receiving a third acknowledge message in response; and after receiving the third acknowledge message, releasing, at the first information telephone, the handset of the first information telephone, and maintaining a busy state between the first and the second information telephone subscribers.

Another aspect of the present invention provides a method for serving character message transmission during a telephone call over PSTN connected to the central office to which a number of information telephones mounted with a display, respectively, are connected for telephone calls as well as for data communication, the method including the steps of: based on SMS message writing and transmission request for use of character message transmission service of a first information telephone subscriber during a telephone call between a first information telephone subscriber and a second information telephone subscriber among the information telephones, if the customer premise equipment (CPE) alerting signal is transmitted from the first information telephone in order to secure data transmitting/receiving reliability, muting, at the first information telephone, a handset of the first information telephone, transferring customer premise equipment (CPE) alerting signal to the second information telephone through the central office in order to data transmitting/receiving reliability, and receiving a first acknowledge message in response; after receiving a message from the first information telephone through the central office for notifying the second information telephone to get prepared for receiving the written SMS message, transferring, at the second information telephone, a second acknowledge message to the first information telephone through the central office; after receiving the written SMS message from the first information telephone, transferring, at the second information telephone, a third acknowledge message to the first information telephone through the central office; and after transferring the third acknowledge message, releasing the handset mute of the second information telephone, and maintaining a busy state between the first and the second information telephone subscribers.

The present invention is very advantageous for both parties, a caller and a called party, because they exchange character messages any time of the conversation on the phone especially when one is having a hard time to figure out what the other is saying because of his or her inaccurate pronunciation or one needs to tell a series of numbers continuously (e.g., telephone numbers or bank account numbers).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail.

Figure 1:
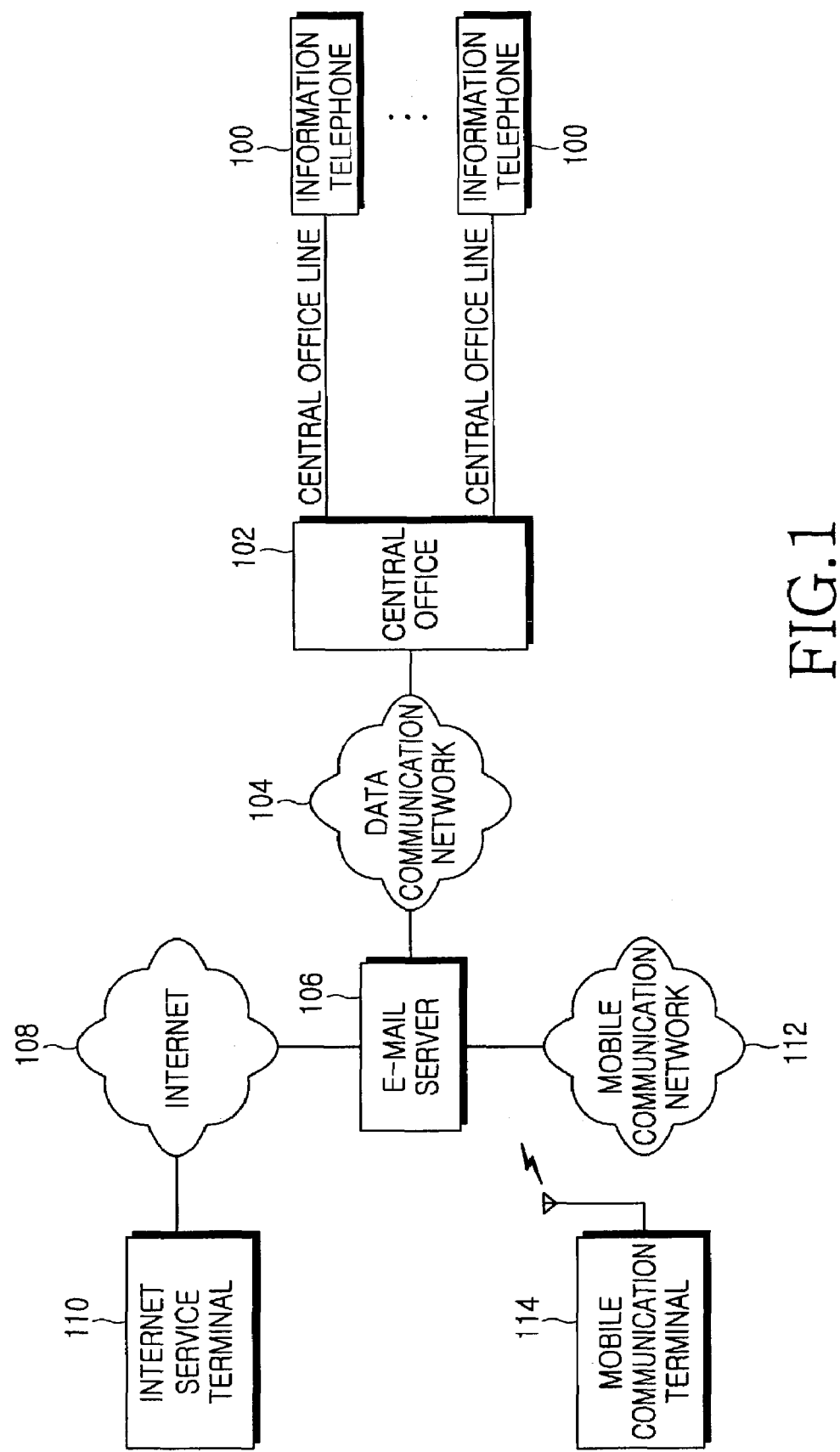
FIG. 1 is a diagram illustrating a configuration of telecommunication system network to which short message transfer service during a telephone call is applied in accordance with a preferred embodiment of the present invention.

FIG. 1 is a diagram illustrating a configuration of telecommunication system network to which short message transfer service during a telephone call is applied in accordance with a preferred embodiment of the present invention. Referring to FIG. 1, information telephones 100 are connected to the central office line of the central office 102, and E-mail server 106 is connected to the central office 102 through data communication network 104 as well as to the Internet 108 and to a mobile communication network 112 for interworking together. In the present embodiment, the information telephone 100 sends and receives E-mail having its telephone number as address or SMS message through the central office line. Also, an Internet service terminal 110 like a personal computer (PC) is connected to the Internet 108, and a mobile communication terminal 114 is connected to the mobile communication network 112 via radio link. E-mail server 106 has a subscriber's database for saving telephone numbers for all information telephones 100, so when the E-mail server receives an e-mail having a telephone number only or SMS message from the Internet 108 or mobile communication network 112 or an information telephone 100, it calls a corresponding information telephone 100 to the telephone number, and sends the received e-mail or SMS message to the same. Therefore, E-mail server 106 has two URLS (Uniform Resource Locator) for use of e-mails and SMS messages to receive e-mails and SMS messages all together and send them to terminating parties. The subscriber's database is mainly used for searching an information telephone 100 subscriber corresponding to a certain telephone number when the e-mail server 106 receives an e-mail or SMS message having a telephone number only in the e-mail address field. Moreover, E-mail server 106 receives an e-mail or SMS message that is supposed to be sent through the Internet 108 or mobile communication network 112, and sends them to the Internet 108 or mobile communication network 112. Shortly speaking, interworking a mobile communication terminal 114 and SMS service can be achieved by interworking e-mail server 106 and message transfer service between mobile communication operators' servers in general. In such manner, applying the same method involved in the general wireless SMS, it is now possible to exchange SMS messages using a subscriber's telephone number only.

Figure 2:
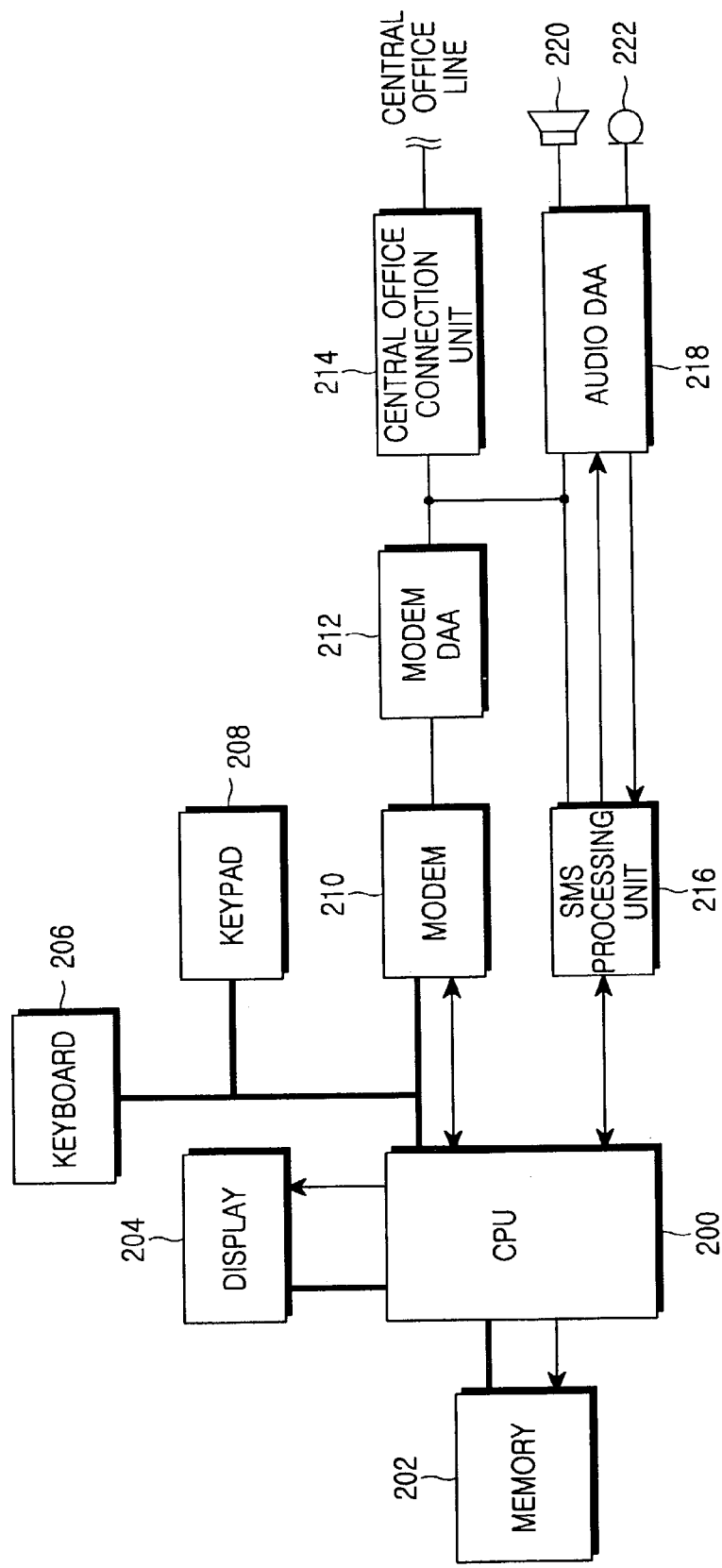
FIG. 2 is a detailed block diagram of individual information telephone depicted in FIG. 1.

FIG. 2 is a detailed block diagram of the individual information telephone depicted in FIG. 1. As shown in the drawing, connected to the central office connection unit 214 which is connected to a central office line of the central office 102 shown in FIG. 1 are SMS processor 216 and audio DAA (Discrete Analog Access) 218, and a modem 210 through modem DAA 212. Modem 210 is connected to CPU (Central Processing Unit) 200, and under the control of CPU 200, it conducts data communication through the central office line.

Central office connection unit 214, like a typical telephone, has a modular jack to be connected to the central office line, and a bridge diode circuit for polarity sort. Modem DAA 212 is connected in between modem 210 and to central office connection unit 214, and acts as an interface for providing an interface between the modem 210 and the central office line. SMS processing unit 216 is connected to CPU 200 and to central office connection unit 214, and conducts SMS message communication through the central office line. Particularly in the present invention, SMS processing unit 216 also transmits/receives messages necessary to provide character message transfer service to the other party during a telephone call. Further, SMS processing unit 216 is capable of transmitting/receiving bidirectional FSK (Frequency Shift Keying), and transmitting/receiving DTMF (Dual Tone Multi Frequency) and CAS (CPE (Customer Premises Equipment) Alerting Signal) tone. On the other hand, audio DAA 218 is connected to central office connection unit 214, to SMS processing unit 216, to voice input/output devices like speaker 220 and microphone 222, and acts as an audio interface for transmitting/receiving voice signals following a telephone call through the central office line. Display unit 204, under the control of CPU 200, displays all information necessary for e-mail and SMS message communications and telephone calls. Among the key input units, keyboard 206 and keypad 208, the keyboard 206 is a character input unit equipped with keys for inputting characters, and provides CPU 200 with key input according to the key operation done by a user. Meanwhile, the keypad 208 has number keys for telephone calls, and provides CPU 200 with key input according to the key operation done by a user. Such key input units include a functional key, helping the user to select an e-mail or SMS message. CPU 200 is a control unit of the information telephone 100 shown in FIG. 2. CPU 200 is connected to memory 202, to modem 210, to SMS processing unit 216, to display 204, to keyboard 206, and to keypad 208, and controls key input through the keyboard 206 and the keypad 208, and controls communication of e-mails and SMS messages upon receiving them from the central office line, and controls telephone calls. Lastly, CPU 200 displays all information necessary for the communication through the display 204. In the meantime, memory 202 that is connected to the CPU 200 stores programs and data required for operating the CPU 200.

E-mail server 106 shown in FIG. 1 corresponds to the PSMSC aforementioned in the related art, and the information telephones 100 are illustrated as one embodiment of CPE that is capable of making telephone calls and doing data communication, being mounted with a display.

Figure 3:
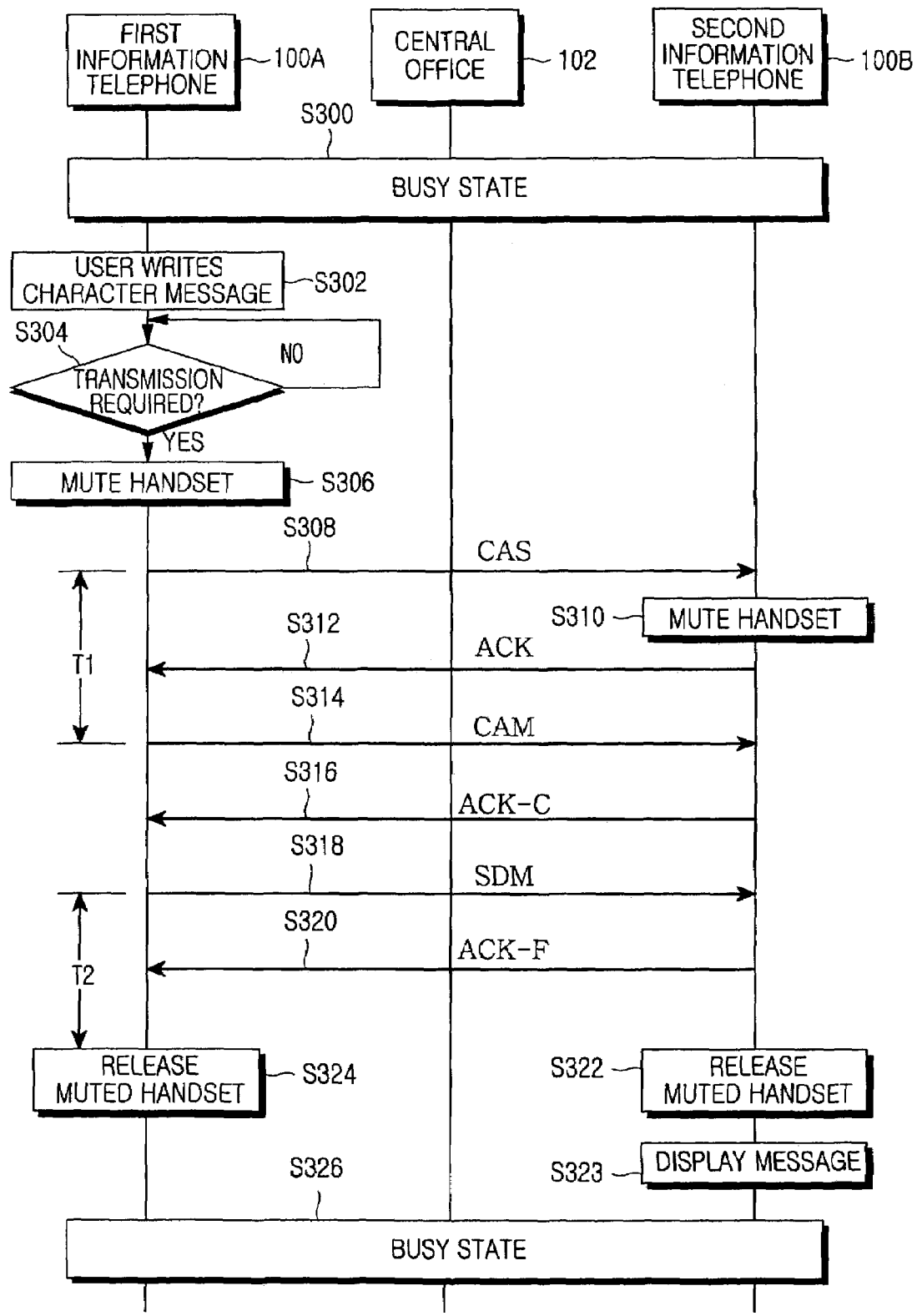
FIG. 3 diagrammatically shows a protocol for short message transfer service during a telephone call over PSTN (Public Switched Telephone Network) in accordance with the preferred embodiment of the present invention.

In fact, the method for serving character message transmission during a telephone call without using any server of the present invention is very beneficial to both subscribers doing the telephone call, especially in case that both subscribers, more specifically, the first and the second information telephones 100A, 100B subscribers shown in FIG. 3 among other information telephones 100 connected to the central office 102 depicted in FIG. 1, are having a difficult time to confirm voice information with each other owing to inaccurate pronunciation of one party or in case that one party telling a series of numbers (e.g., telephone numbers or band account numbers) to the other party continuously.

The character message transfer service comes in handy for a such case as illustrated in FIG. 3, that is, when the first and the second information telephone 100A, 100B, subscribers require the service in the middle of their conversation (S300). Here, the first information telephone 100A subscriber presses the key for selecting a SMS message sending function on the information telephone depicted in FIG. 2, and writes a SMS message for the character message transfer service during the telephone call by using keyboard 206 and keypad 208. Suppose, for example, a subscriber writes a SMS message, "Seongyoub 123-456-7788-232" (S302). At this time, the subscriber inputs the characters "Seongyoub" using the keyboard 206, and inputs "123-456-7788-232" using the keypad 208. Thusly written SMS message is then displayed on the display 204 under the control of CPU 200.

When the transmission request of a SMS message for the character message transfer service during a telephone call is inputted through the corresponding functional key, CPU 200 of the first information telephone 100A checks the transmission request (S304), and mutes the handset of the first information telephone 100A (S306). The handset is muted not to make any disturbing tone noises as the signals used for the character message transfer service are carried as tones.

After muting the handset, CPU 200 of the first information telephone 100A controls SMS processing unit 216 for transferring CAS (CPE Alerting Signal) to secure data transmitting/receiving reliability. Then, SMS processing unit 216 generates a CAS in FSK mode, and transfers the signal to central office connection unit 214 through the central office line (S308). On the other hand, the CAS from the central office line is sent to the second information telephone 100B through the central office 102, using a voice channel during the telephone call between the first and the second information telephones 100A, 100B. Transferring data through a voice channel is done in conforming to FSK (Frequency Shift Keying) mode. Moreover, CPU 200 of the first information telephone 100A drives a timer T1 for counting a first period that is designated beforehand. This pre-designated first period is a little bit longer than the time taken by the second information telephone 100B from acknowledging the CAS to transmitting an ACK (Acknowledgement) signal, and it is usually one of 100 ms through 150 ms.

Once the second information telephone 100B receives the CAS, it mutes its handset, and as in the step 312 of FIG. 3, transmits an ACK signal to the first information telephone 100A through the central office 102.

The first information telephone 100A checks whether the ACK from the second information telephone 100B is received before the timer T1 ends or whether the timer T1 is about to be expired. If the ACK from the second information telephone 100B is received before the timer T1 is expired, or the timer T1 has been expired, that is, the pre-designated first period lapsed, the first information telephone 100A transfers a CAM (CPE Alerting Message) to the second information telephone 100B through the central office 102 for notifying the second information telephone 100B to get prepared for receiving a SMS message a subscriber wrote.

Upon receiving the CAM, the second information telephone 100B transfers an ACK-C (Acknowledge Message for CAM) to the first information telephone 100A through the central office 102, as in the step 316.

Figure 4:
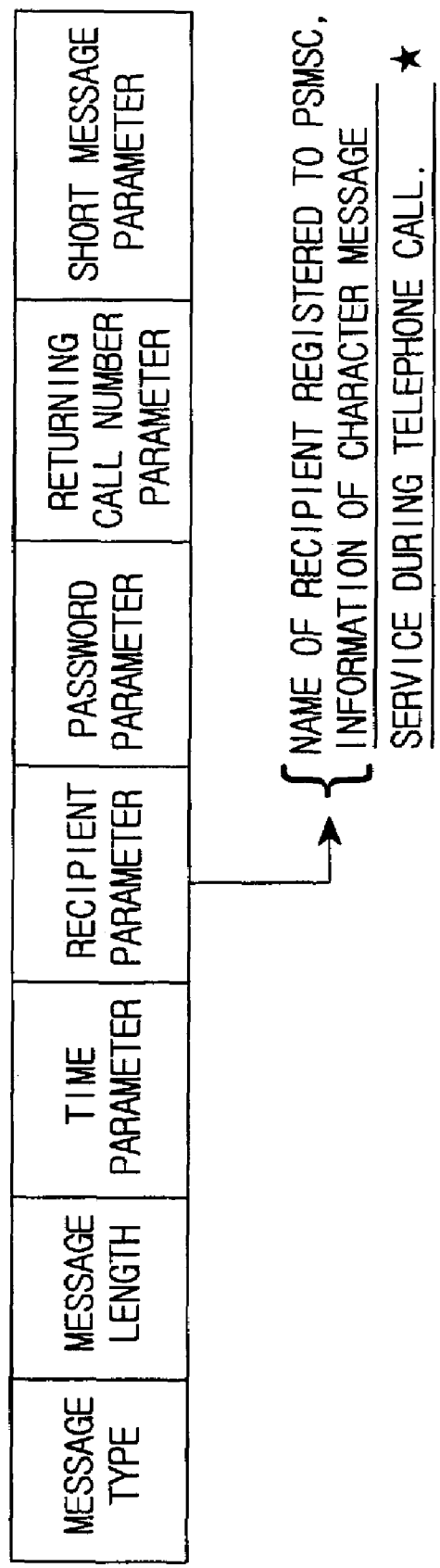
FIG. 4 is a diagram explaining SDM message format shown in FIG. 3.

The first information telephone 100A checks if the ACK-C from the second information telephone 100B has been received, and if it has, transfers the SMS message, SDM (SMS Data Message), written by the first information telephone 100A subscriber, to the second information telephone 100B through the central office 102, as done in the step 318 of FIG. 3. The SMS message, SDM, has the same message format with the one shown in FIG. 4. Referring to FIG. 4, SDM includes message type, message length, time parameter, recipient parameter, password parameter, returning call number parameter, and short message parameter. The time parameter is an essential parameter and has a record of time information. On the other hand, the recipient parameter, the password parameter, the returning call number parameter, and short message parameter are optional. The recipient parameter indicates the name of the recipient that is registered to a general PSMSC (it corresponds to E-mail server 106 of FIG. 1), and includes a record of information for indicating the character message transfer service during a telephone call, given that the subject service is being provided according to the present invention. The short message parameter includes messages the first information telephone 100A subscriber writes. The first information telephone 100A operates the timer T1 for counting a pre-designated second period. This pre-designated second period is slightly longer than the time taken by the second information telephone 100B from acknowledging the SMS message, SMS, to transmitting an ACK-F (Acknowledgement Message for FSK data), and it is designated close to 400 ms.

Once the second information telephone 100B receives the SMS message SDM, as in the step 320 of FIG. 3, it transfers the ACK-F (Acknowledgement Message for FSK data since the SDM message is transmitted as FSK data) to the first information telephone 100A through the central office 102. Then, the second information telephone 100B releases its handset (S322 in FIG. 3). Moreover, the second information telephone 100B displays the content of the SMS message SDM on the display 204 (S323 in FIG. 3). For example, the second information telephone 100B displays the SMS message, "Seongyoub 123-456-7788-232", written by the first information telephone 100A subscriber, on the display 204.

On the other hand, before the timer T2 is expired, the first information telephone 100A checks whether the ACK-F from the second information telephone 100B is received or whether the timer T2 is about to be expired. If the ACK-F from the second information telephone 100B is received before the timer T2 is expired, or the timer T2 has been expired, that is, the pre-designated first period lapsed, the first information telephone 100A releases the muted handset of the first information telephone 100A (S324 in FIG. 3).

As the first and the second information telephones 100A, 100B release their handset muting, the first information telephone 100A and the second information telephone 100B go back to a busy mode (S326 in FIG. 3). Further, through the SMS message displayed on the display 204, the second information telephone 100B subscriber can confirm the message the first information telephone 100A subscriber wanted to send.

In the meantime, suppose that the second information telephone 100B subscriber writes a message and transfers the message in the middle of conversation, as in the step 326 of FIG. 3. In such case, the second information telephone 100B is being the first information telephone 100A, while the first information telephone 100A is being the second information telephone 100B.

In conclusion, the present invention is very advantageous for both parties, a caller and a called party, because they exchange character messages any time of the conversation on the phone especially when one is having hard time to figure out what the other is saying because of his or her inaccurate pronunciation or one needs to tell a series of numbers continuously (e.g., telephone numbers or bank account numbers). Also, the above-described service is available even in the absence of a server for any voice calls using voice channels over PSTN.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for serving character message transmission during a telephone call over Public Switched Telephone Network connected to a central office to which a number of information terminals mounted with a display, respectively, are connected for telephone calls as well as for data communication, the method comprising the steps of:

based on Short Message Service message writing and transmission request for use of character message transmission service of a first information terminal subscriber during a telephone call between a first information terminal subscriber and a second information terminal subscriber among the information terminals, muting, at the first information terminal, a handset of the first information terminal, transferring customer premise equipment alerting signal to the second information terminal through the central office in order to accommodate data transmitting/receiving reliability, and receiving a first acknowledge message in response;

after receiving the first acknowledge message, transferring, at the first information terminal, a message to the second information terminal through the central office for notifying the second information terminal to get prepared for receiving the written Short Message Service message, and receiving a second acknowledge message in response;

after receiving the second acknowledge message, transferring, at the first information terminal, the written Short Message Service message to the second information terminal through the central office, and receiving a third acknowledge message in response; and after receiving the third acknowledge message, releasing, at the first information terminal, the handset of the first information terminal, and maintaining a busy state between the first and the second information terminal subscribers.

2. A method for serving character message transmission during a telephone call over Public Switched Telephone Network connected to a central office to which a number of information terminals mounted with a display, respectively, are connected for telephone calls as well as for data communication, the method comprising the steps of:

when the customer premise equipment alerting signal is transmitted from the first information terminal in order to secure data transmitting/receiving reliability according to Short Message Service message writing and transmission request for use of character message transmission service of a first information terminal subscriber during a telephone call between a first information terminal subscriber and a second information terminal subscriber among the information terminals, muting, at the second information terminal a handset of the second information terminal and transferring a first acknowledge message to the first information terminal through the central office;

after receiving a message from the first information terminal through the central office for notifying the second information terminal to get prepared for receiving the written Short Message Service message, transferring, at the second information terminal, a second acknowledge message to the first information terminal through the central office;

transferring, at the second information terminal, a third acknowledge message to the first information terminal through the central office after receiving the written Short Message Service message from the first information terminal; and releasing the handset mute of the second information terminal after transferring the third acknowledge message, and maintaining a busy state between the first and the second information terminal subscribers.

3. The method as claimed in claim 2, with the Short Message Service message being displayed on the display of the second information terminal at the same time of releasing the handset mute of the second information terminal.

4. A method for serving character message transmission during a telephone call over a Public Switched Telephone Network connected to a central office to which a plurality of information terminals mounted with a display, respectively, are connected for telephone calls as well as for data communication, the method comprising the steps of:

based on Short Message Service message writing and transmission request for use of character message transmission service of a first information terminal subscriber during a telephone call between a first information terminal subscriber and a second information terminal subscriber among the information terminals, muting, at the first information terminal, a handset of the first information terminal, transferring customer premise equipment alerting signal to the second information terminal through the central office in order to accommodate data transmitting/receiving reliability, and queuing to receive a first acknowledge message thereof;

when the first acknowledge message is received within a pre-designated first period or the pre-designated first period is lapsed after transmitting the customer premise equipment alerting signal, transporting, at the first information terminal, a message to the second information terminal through the central office for notifying the second information terminal to get ready for receiving the written Short Message Service message, and receiving a second acknowledge message thereof;

transferring, at the first information terminal, the written Short Message Service message to the second information terminal through the central office after receiving the second acknowledge message, and queuing to receive a third acknowledge message thereof; and when the third acknowledge message is received within a pre-designated second period or the pre-designated second period is lapsed after transmitting the written Short Message Service message, releasing, at the first information terminal, a muted handset of the first information terminal, and maintaining a busy state between the first and the second information terminal subscribers.

5. The method as claimed in claim 4, with the first period being greater than the time taken by the second information terminal from acknowledging the customer premise equipment alerting signal to transmitting a first acknowledgement signal, and the first period being in a range of 100 ms to 150 ms.

6. The method as claimed in claim 4, with the second period being longer than the time taken by the second information terminal from acknowledging the Short Message Service message to transmitting a third acknowledgement message, and the second period being approximately 400 ms.

7. The method as claimed in claim 4, with the Short Message Service message comprising message type, message length, time parameter, recipient parameter, password parameter, returning call number parameter, and short message parameter, and the recipient parameter being a record of information for indicating a character message transfer service during a telephone call at the time of providing the character message transfer service during the telephone call.

* * * * *